Feb. 21, 1939.    J. H. HOERN    2,147,899
METHOD OF MAKING SELF-LOCKING SCREWS
Filed Dec. 23, 1935
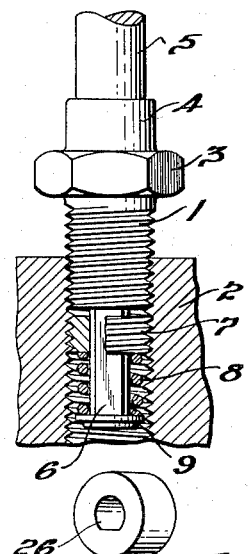
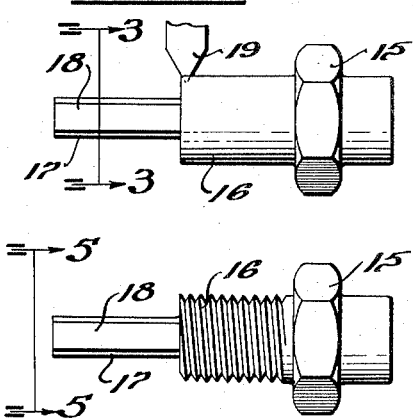
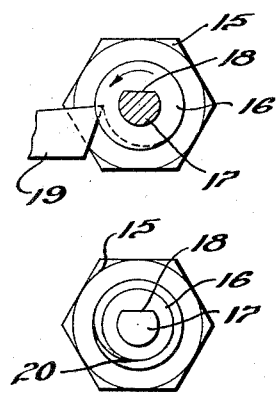
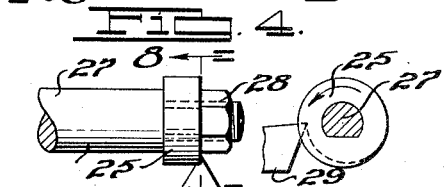
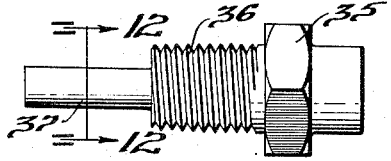
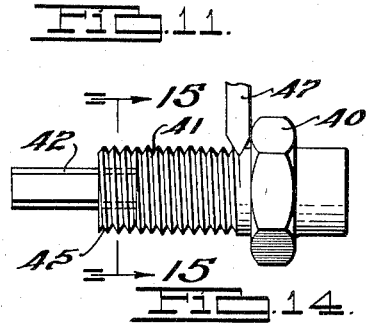
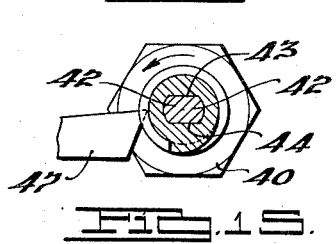
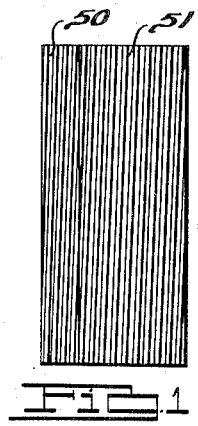
INVENTOR
Joseph H. Hoern.
BY
Barnes, Dickey, Pierce & Hanss
ATTORNEYS.

Patented Feb. 21, 1939

2,147,899

UNITED STATES PATENT OFFICE

2,147,899

METHOD OF MAKING SELF-LOCKING SCREWS

Joseph H. Hoern, Saginaw, Mich., assignor, by mesne assignments, to Eaton Manufacturing Company, Cleveland, Ohio, a corporation of Ohio Application December 23, 1935, Serial No. 55,712

1 Claim. (Cl. 29—148)

This invention relates to a novel and improved method of manufacturing self-locking screws. More particularly the present invention relates to an improved method of manufacturing composite threaded machine screws, which when screwed into a suitable threaded recess serve to lock themselves automatically in predetermined position and which are not readily subject to displacement or rotation as the result of vibration or other stresses imposed upon them.

Screws of the general type with which the method of the present application is primarily concerned generally comprise a head portion adapted to be engaged by wrench or any other suitable means and a threaded shank. The shank portion of the screw is provided with an axial extension of substantially reduced diameter and of non-cylindrical cross-section. As will hereinafter be more clearly seen, the particular cross-section of this extension portion is more or less immaterial except that it serves to prevent relative rotational movement of a lock element which is mounted for axial movement thereon. The lock element has its peripheral surface threaded with threads of the same diameter and pitch as those on the screw shank and is slidably mounted upon this extension portion. A helical coil spring, which has one end anchored adjacent the terminal end of the extension portion, bears against the outer axial face of the lock element, thus normally urging it closely into engagement with the axial face of the shank portion of the screw. As will hereinafter be clearly seen, the threads on the shank of the screw and those on the peripheral surface of the lock element are mismatched. That is, when the members are urged closely into engagement, the thread of one does not constitute a continuation of the thread of the other. It is essential to screws of this general character that this offset relation exist in order that the element will exercise effective locking action.

It is a general object of the present invention to provide a relatively simple and extremely practical method of manufacture for self-locking screws of this general type.

Still further it is an object of the present invention to provide a self-locking screw construction of the type defined above in which the angular degree or extent to which the threads on the shank of the screw and threads on the peripheral surface of the lock element are mismatched, is accurately determined.

Yet another object of the present invention is to provide a method for manufacturing self-locking screws of this general class in which the point at which the thread lead on the screw shank ends is accurately positioned with respect to the non-cylindrical extension formed on the shank of the screw.

Still further the present invention contemplates the provision of a method for manufacturing lock elements provided with apertures having a configuration adapted to receive the particular extension formed on the shank of the screw and of a method for threading the peripheral surfaces of these lock elements in order that the lead of the thread at the point where it commences will have a definite, predetermined angular position with respect to the configuration of the aperture through the axial portion of the lock element, in order that when the lock element is fitted on to the improved screw, a definite predetermined angularity or offset between the adjacent terminal ends of the respective threaded surfaces will be obtained.

The present invention contemplates the provision of a method in which a screw shank and cooperating peripherally threaded lock element are mounted in coaxial non-rotatable position with respect to each other. The specific method of the present invention relates to a process for threading the surface of the screw shank and the surface of the lock element in such a manner that the points where the lead of the thread about the screw shank emerges from the axial end of the screw shank is angularly offset a substantial distance from the point where the lead of the thread on the lock element emerges from the adjacent axial end thereof.

In order to provide a method which will accomplish the above results, it will be appreciated that it is inherent that a method of threading the individual parts must be provided in which the actual point of emergence of the lead of the screw thread may be accurately controlled with respect to the non-circular axial central portion of the member being threaded. This exact control of these points is necessary in order that the lock element may be interchangeably used with various studs as may be desired and as may be quite essential in order to simplify assembly operations.

Still further the present invention contemplates the provision of a method by which the threads may be formed simultaneously upon both the shank of the screw and the peripheral surface of the lock element while these two members are arranged in predetermined axial position with respect to each other. In furtherance of this last mentioned object, the present invention contemplates the provision of a die which has two separate sets of forming teeth thereon, one of said sets of teeth being substantially offset from the other in order that the adjacent ends of the thread leads on the two members will be offset from one another the predetermined required angular distance.

In order that a more complete understanding of the present invention may be had, reference is directed to the prior co-pending application of Zeder, Serial No. 40,009, filed September 11, 1935, now Patent No. 2,098,897, in which is shown specifically the tappet construction, which, as is explained hereinafter, may be conveniently manufactured by the method of the present case.

Many other and further objects and advantages of the present invention will become apparent from the following specification when considered in consideration with the accompanying drawing forming a part thereof.

In the drawing:

Fig. 1 is a vertical elevational view with parts in section illustrating a screw manufactured in accordance with the teachings of the present invention, showing the screw threaded into a suitable recess.

Fig. 2 is a top plan view of a blank from which the improved screw is made, illustrating the beginning of the threading operation on the shank thereof.

Fig. 3 is a transverse sectional view taken on the line 3—3 of Fig. 2 showing the manner in which the threading operation is commenced.

Fig. 4 is a top plan view of the completed screw member showing the shank thereof completely threaded.

Fig. 5 is a sectional view taken on the line 5—5 of Fig. 4 showing the completely threaded screw member.

Fig. 6 illustrates in perspective the blank from which the locking member is formed.

Fig. 7 is a top plan view of the blank shown in Fig. 6 mounted upon a suitable mandrel, showing the beginning of the operation for threading the peripheral surface of the lock element.

Fig. 8 is a sectional view taken on the line 8—8 of Fig. 7 illustrating the point of emergence of the lead of the thread on the lock element.

Fig. 9 is a side elevational view of the finished threaded lock element.

Fig. 10 is an end view of the finished lock element.

Fig. 11 is a top plan view of a screw manufactured in accordance with a modified form of the method of the present invention, in which the threading of the shank portion of the screw takes place prior to the deformation or flattening of the extension portion thereof.

Fig. 12 is a transverse sectional view taken on the line 12—12 of Fig. 11 showing the completely threaded screw member prior to the flattening of the extension portion thereof.

Fig. 13 is an end view of the screw element after the extension portion thereof has been preformed.

Fig. 14 shows a screw manufactured according to a modified form of the method of the present invention, in which both locking element and screw shank may be threaded in the same operation.

Fig. 15 is a sectional view taken on the line 15—15 of Fig. 14 showing a cross-sectional shape of extension particularly adaptable for practicing this modified form of the invention.

Fig. 16 is a plan view of a composite rolling die adapted for the simultaneous formation of threads on both the shank of the screw and the lock element member.

Fig. 17 illustrates the manner in which the threads are formed simultaneously upon both the screw shank and the lock element member by members of the composite die of the type shown in Fig. 16.

With more particular reference to the drawing, the improved self-locking screw member, to which the method of the present invention is primarily directed, is shown in completely assembled form in Fig. 1. While it will be readily appreciated that the method of the present invention is susceptible of very many different uses in the manufacture of self-locking screw elements of many and various types, by way of ilustration I have shown a particularly specific form of screw element which readily lends itself to manufacture by the method of the present invention. The screw element shown by way of illustration in Fig. 1, while susceptible of many and various uses, is primarily designed for the adjustment of valve tappets in internal combustion engines. It has long been appreciated that screws of this general type are particularly adaptable for this specific use and in installations of this generic class it is particularly desirable that the relative axial position of the screw member with respect to the member into which it is threaded must be not only easily adjusted but must be accurately maintained after the adjustment has been made.

In the construction shown in Fig. 1 the screw comprises a cylindrical shank portion 1 threaded into a suitable casting 2. The shank portion may be rotated by means of a suitable hexagonal head 3, preferably formed integrally therewith and adapted to be engaged by a wrench or other suitable means, and having there above a head portion 4 adapted to receive the base end of a valve push rod or valve stem 5. The shank portion 1 of the screw is provided with an axially extending projection 6 of reduced diameter which has one side thereof flattened in order that the projection 6 will be of non-circular configuration. Mounted on the projection 6 and axially movable therealong is a lock element 7 having a threaded outer periphery and having a central aperture of a configuration adapted to receive the projection 6 and preclude relative rotational movement between the lock element 7 and the main body portion of the screw. A compression coil spring 8, having one end abutting the lock element 7 and the other end abutting a suitable washer 9, disposed around the projecting reduced portion of the screw 1, positions the lock element with respect to the shank of the screw. The washer 9 is preferably retained in position by means of swaging over the outer end of the extension of the screw shank. It will be appreciated from the construction described above that the lock element 7 is continually urged against the axial face of the threaded shank of the stud 1. As will be more clearly seen hereinafter, the threads on the shank 1 and on the peripheral surface of the lock element 7 are mismatched sufficiently so that when both of these members threadably engage the threaded recess in the casting 2 in which they are screwed, it is necessary that some axial displacement of the lock element 7 take place with respect to the threaded shank portion of the screw in order that the threads on both these members will mate with the threads of the threaded recess. It will be seen that such axial displacement serves to compress the spring 8 and causes a constant compression of this spring, locking the stud as a whole in predetermined position with respect to the recess in which it is screwed firmly enough to prevent relative rotation thereof under the shocks and vibration to which it is subjected to in service, yet permitting it to be readily adjusted by means of a wrench.

One form of the improved method of manufacturing self-locking screws is shown in detail in Figs. 2 to 10 inclusive of the drawing. A blank is formed having a suitable head portion 15, a cylindrical shank 16 and an axial extension 17 of reduced diameter. This axial extension is preferably milled or ground to flatten one surface thereof at 18 to create a structure of uniform non-circular cross section throughout its entire length. While the shank of the screw may be threaded in any suitable manner by means of a rotary die or rolling dies, I have shown by way of illustration the threading operation being performed by means of a conventional threading tool 19 of a lathe. Irrespective of the particular means by which the shank 16 of the screw is threaded, it is essential that this threading operation is accurately controlled in order that the lead of the thread cut on the shank will emerge from the axial end of the shank at a predetermined point with respect to the flattened surface 18 of the axial extension 17. By reference to Fig. 3, it may be seen that in the thread cut on the particular blank shown, by means of the tool 19, the point of emergence of the thread lead at the axial end of the screw shank occurs at approximately the point 20.

It will be noted by reference to Figure 5 that the point of emergence 20 of the lead of the thread cut on the shank of the screw lies at a point diametrically opposite from the flattened portion of the axial extension. As will hereinafter be seen, the angular position of this point of emergence is not important except in relation to the angular position of the point of emergence of the thread lead on the adjacent portion of the locking element.

A cylindrical lock washer blank, shown in perspective in Figure 6, is provided. This blank has a central aperture 26 of a configuration adapted to fit closely over the axial extension on the screw in order that the lock element will be freely axially movable with respect to the screw, but non-rotatably mounted with respect thereto. The outside diameter of this lock element is preferably identical with the outside diameter of the screw shank and is threaded with a series of screw threads of the same form and pitch. In order to perform this threading operation, the lock element is clamped on a suitable mandrel 27 as by a nut such as 28 or by another suitable means, and while it may be threaded by means of rolling dies or rotary dies, as may be desired, Figures 7 and 8 of the drawing disclose the threading operation being performed by means of a threading tool 29 of a lathe. It is likewise extremely important in threading the peripheral surface of this lock element that the lead of the thread will emerge from the axial end of the lock element at a predetermined point with respect to the non-circular aperture therein. As will be seen by reference to Figure 8, the point of emergence of this thread lead lies at substantially the point 30. It will be noted that this point of emergence 30 is adjacent the flattened portion of the aperture in the locking element and consequently when the locking element is slid onto the projection on the screw shank the point of emergence 30 will be angularly offset approximately 180 degrees from the point of emergence 20 of the lead of the thread on the screw shank. It will be appreciated that the degree of this angular offset relation of these thread leads may be varied within relatively wide limits. It will be appreciated that the degree of angular offset between the points of emergence of these thread leads determines the axial position to which the lock element must be moved away from the adjacent end of the screw shank in order that the threads of both members will lie in the same helix.

After the threading operation of the lock element has been completed, the lock element is slid on to the axial extension on the screw and moved into closely abutting relation with the axial end of the screw shank. Due to the non-circular configuration of the axial extension 17 on the screw shank and the complemental configuration of the aperture 26 in the central portion of the lock element, it will be appreciated that relative rotational movement between the lock element and the screw will be prevented. It will further be noted that the points of emergence of the thread lead on the screw shank and on the adjacent axial end of the lock element will be angularly offset from each other approximately 180 degrees. The assembly operation is then completed by mounting the spring element 8 around the end of the axial extension and securing this spring element in place by means of the washer 9 and upset end of the axial extension.

The lock element is then, at all times urged, into close engagement with the adjacent axial face of the screw shank. It will therefore be apparent that the thread leads on the screw shank and on the peripheral surfaces of the lock element lie in parallel helices, but due to the offset relation of the point of emergence of the adjacent end of these leads, the thread on one element will not constitute a continuation of the thread on the other element and consequently the thread to the two members will be mismatched or offset as long as the lock element is in closely abutting relation with the adjacent end of the screw shank.

Referring again to Figure 1, it will be appreciated that as the assembled self-locking screw is screwed into a threaded recess, the mismatching of the thread of the screw shank and lock element will cause a necessary axial movement of the lock element serving to compress the spring 8, the extent of this movement depending upon the angularity of offset between the points of emergence of the thread leads on the two elements. This axial movement is sufficient to establish a definite clearance between the lock element and the end of the screw shank and consequently by means of the spring 8 a constant tension is exerted upon the inter-engaging threaded portions, thus yieldably locking the screw in adjusted position.

A modified form of the invention is illustrated in Figures 11 to 13 inclusive. In this form of the invention, a blank is provided having a head portion 35, a cylindrical threaded shank 36, and a cylindrical axial extension 37 of reduced diameter, formed preferably integrally with the shank of the screw. This modified method of manufacture of screws of this general type differs from the method described above in that the shank of the screw is threaded prior to the flattening or deformation of the axial extension thereon. Due to the fact that the axial extension 37 is cylindrical at the time the threading operation is performed, it may be appreciated that the shank of the screw may be threaded in any suitable manner and after it has been threaded the axial extension 37 is milled or ground to provide a flat surface 38. This flattened surface 38 is formed on a circumferential portion of the axial extension predetermined, with respect to the point of emergence 39 of the lead of the thread on the screw shank. As was the case in the preferred embodiment of the invention described above, this axial extension portion may be flattened upon the diametrically opposite side of the screw from that on which the lead of the thread emerges. As has been brought out above, this construction will create an angularity of offset between the thread leads on the screw shank and locking element of approximately 180 degrees, but, as has been pointed out above the specific extent of this angular offset is not important and may be varied within relatively wide limits. However, it is essential to the operation of the device that some offset relation exist. It will be appreciated that in this modified method of manufacture the resulting product is substantially identical with that shown in Fig. 4 and described above, and that a lock element identical with the element shown in Fig. 9 may be used with this member to provide an identical self-locking screw construction.

A still further modified method of manufacture of screws of this general type is shown in Figures 14 and 15. In this form of the invention a blank is provided having a suitable head portion 40, a shank 41 and an axial extension 42. This axial extension 42 is of substantially reduced diameter with respect to shank 41 and is milled to provide flat surfaces 43 and 44 on diametrically opposite sides thereof. A lock element 45 having an outside diameter substantially identical with that of the screw shank 41 is preformed to provide an axial aperture therein of a configuration adapted to receive the axial extension 42. This lock element 45 is slid onto the axial extension 42 and urged into closely abutting relation with the axial end of the screw shank 41. The lock element and screw shank 41 are then both threaded by means of a cutting tool 47. It will be appreciated that while these members are in this position the lead of the thread on the lock element will lie in the same helix as the lead of the thread on the screw shank. After the threading operation has been completed, the lock element 45 may be slipped off the axial extension 42 and rotated through 180 degrees and re-assembled therewith. This step will serve to insure a proper offset or mis-matched relation between the threads on the lock element and on the screw shank, and the resulting screw will then have substantially the same general characteristics as the screws formed by the method described above.

A still further modified form of the method disclosed herein is illustrated in Figures 16 and 17. This method utilizes a novel form of rolling die which makes possible the simultaneous formation of threads upon both the screw shank and on the peripheral surface of the lock element while these two members occupy substantially their final assembled position. In the method of this form of the invention, a pair of composite rolling dies of novel construction are used for the simultaneous formation of the threads on both the screw shank and lock element. These improved composite rolling dies each preferably comprises a pair of sections 50 and 51 which are preferably formed by locking them in side-by-side relation and cutting and/or grinding a plurality of thread cutting grooves in the surfaces thereof. The die 50 is of a width substantially the same as the axial length of the lock element to be threaded and section 51 is of a width substantially the length of the threaded area which it is desired to form on the screw shank. It will be appreciated that after the grooves have been cut in the surfaces of these die members the threads of the section 50 will be matched with those of the section 51 and, consequently, it is necessary, in order that the method of the present invention may be satisfactorily practiced, that a mis-matching or offset relation between the thread-forming grooves on the adjacent die sections be established. While this offset or mis-matching relation between the thread cutting grooves of the two sections 50 and 51 may be established by grinding or milling off the adjacent edges of the members until the required offset is obtained, Figure 17 of the drawing illustrates a shim or spacing element 52 mounted between the sections 50 and 51 which has a thickness sufficient so that the threads rolled by the die member will lie in parallel but different helices.

In practicing the improved method by use of rolling dies such as are disclosed in Figure 17, a blank such as is illustrated in Figure 2 has a lock element blank, such as is shown in Figure 6, mounted thereon with the axial face of the lock element 25 in closely abutting relation with the axial end of the shank portion 16 of the screw. The screw shank and lock element are then rolled between a pair of dies each composed of sections 50 and 51 with a shim or spacing element 52 between the sections thereof in order to establish the required offset or mismatching of the threads to be formed. Consequently, it will be appreciated that the threads formed on the shank of the stud and on the peripheral surface of the lock element will be simultaneously rolled and will be provided with adjacent lead ends having the desired angular offset relation with respect to each other.

The specific methods set forth above are merely illustrative of the generic inventive concept defined in the subjoined claim. Many other and further modifications and forms thereof will be apparent to those skilled in the art.

What is claimed is:

The method of making self locking screws which comprises forming a cylindrical extension on the shank of said screw, flattening the surface of said extension on diametrically opposite sides, forming a lock element having an aperture adapted to receive said extension and having a peripheral surface substantially the same diameter as the shank of said screw, assembling said screw and lock element in coaxial position, cutting a continuous thread on the shank of said screw and peripheral surface of said lock element, and reassembling said screw and lock element after rotating said lock element through 180 degrees whereby the thread thereon and the thread on the shank of the screw will be angularly offset with respect to each other.

JOSEPH H. HOERN.